Patented May 30, 1933

1,912,314

UNITED STATES PATENT OFFICE

ARTHUR M. SIMPSON, OF NEW YORK, N. Y., ASSIGNOR TO VAN KANNEL REVOLVING DOOR COMPANY, OF NEW YORK, N. Y., A CORPORATION OF NEW JERSEY

PRESSURE TRANSMITTING FLUID COMPOSITION

No Drawing.   Application filed November 14, 1931. Serial No. 575,165.

This invention relates generally to fluid compositions, and comprehends an improved pressure transmitting fluid which is particularly adapted for use in hydraulic door checking devices, such as that disclosed in my copending application, Serial No. 567,969 filed October 9, 1931, or in other similar capacities.

The principal object in view is to provide an improved fluid composition for the purpose specified, the fluidity, viscosity or pressure transmitting quality of which is not affected to any appreciable extent by temperature changes, atmospheric variations or climatic differences, so that the same acts with uniformity and precision under practically any condition or circumstance to which it may be subjected in its ordinary use.

With the above recited and other objects in view, the invention resides in the novel combination of ingredients set forth in the following specification, while the claims define the actual scope thereof.

The composition consists of a suitable oil, preferably a mineral oil which is mixed with a metallic element liquid at ordinary temperatures, such as mercury, and in approximately equal proportions measured by volume, to provide a mixture which will operate practically as though having a constant viscosity at all atmospheric temperatures. In practice, it has been found that any good quality oil employed as a lubricant for automotive engines may be employed in the mixture. The use of oil alone has been found impractical, for while it has a high viscosity, its variation in viscosity is too great in the usual temperature ranges to render the same practical for use independent of some medium for offsetting its variation. The use of mercury or an equivalent alone is impractical, for notwithstanding the fact that the variation in the viscosity of mercury is very slight in the usual temperature ranges, the viscosity of mercury or its equivalent is so low that it will not build up the desired pressure which is effective for the purpose. It has been found, however, that oil and mercury or their equivalents mix and form an emulsion which is semi-permanent and sufficiently lasting when agitated or mixed periodically by circulation through a door checking device of the character set forth or when employed in any other similar capacity where the composition is not confined and expansion or contraction thereof does not impair its use. In other words, the combination or mixture of the two ingredients specified, namely, the oil and mercury or equivalents in approximately the proportions set forth, secures the benefit of the high viscosity of the oil and the relatively constant viscosity of the mercury while said mixture further serves in the capacity of an effectual lubricant. As a further attribute, the mixture or composition will not freeze at the lowest temperature to which it could possibly be subjected and where it is used as a checking or retarding medium, as in a regulating device for revolving doors or in similar capacities, there is no perceptible difference in its working between the range in the highest and lowest temperatures to which it could possibly be subjected.

What is claimed is:

1. A pressure transmitting fluid composition consisting of a mixture of oil and mercury in approximately equal proportions as measured by volume.

2. A pressure transmitting fluid composition composed of a mixture of an oil having the characteristics of an automotive engine lubricating oil and mercury.

3. A pressure transmitting fluid composition consisting of a mixture of a mineral oil and mercury in approximately equal proportions as measured by volume.

Signed at 716 Whitlock Ave., in the county of Bronx and State of New York this 31st day of October, 1931.

ARTHUR M. SIMPSON.